March 23, 1926.
H. G. RAIRDAN
BRAKE
Filed Dec. 5, 1924
1,577,983
2 Sheets-Sheet 1
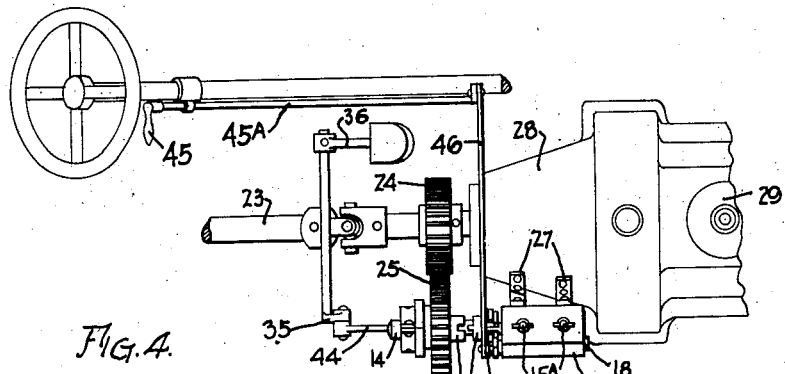
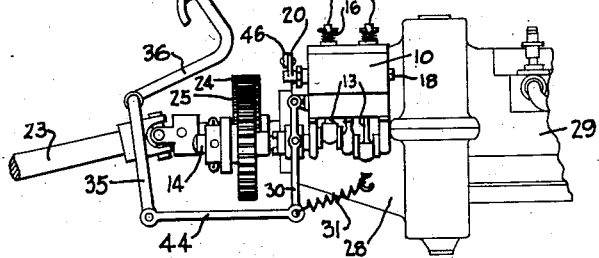
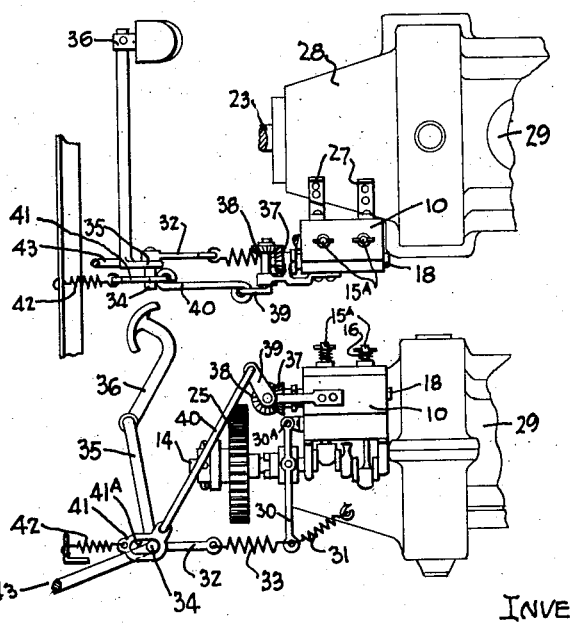
INVENTOR
Henry G. Rairdan
BY
Frank J. Schraeder Jr.
Attorney.

March 23, 1926.  H. G. RAIRDAN  1,577,983

BRAKE

Filed Dec. 5, 1924  Sheets-Sheet 2

INVENTOR
Henry G. Rairdan.
BY
Frank J. Schraeder Jr.
Attorney

Patented Mar. 23, 1926.

1,577,983

UNITED STATES PATENT OFFICE.

HENRY G. RAIRDAN, OF LARNED, KANSAS.

BRAKE.

Application filed December 5, 1924. Serial No. 754,059.

*To all whom it may concern:*

Be it known that I, HENRY G. RAIRDAN, a citizen of the United States, residing at Larned, in the county of Pawnee and State of Kansas, have invented new and useful Improvements in Brakes, of which the following is a specification.

This invention relates generally to brakes but has particular reference to brakes adaptable to automotive vehicles.

One of the objects of my invention is to provide a novel and efficient oil brake which is readily adaptable to operative connection with the drive shaft of an automobile.

Another object of my invention is to provide an improved oil brake having reciprocating pistons operating to compress a regulated body of oil for the purpose of transmitting a braking action directly on the drive shaft of an automobile.

A further object of the invention resides in novel means actuated by a foot brake for operatively connecting the reciprocating pistons with the drive shaft and then graduating inducing a braking action of the piston by further or continued pressure on the foot brake.

A further object of my invention resides in the connection of my improved brake to the present type of automobile wheel brakes.

A still further object is to provide a brake of the above character with means for gradually controlling the pressure exerted by same; such means being located on the steering post or column of the automobile.

With these and other objects in view my invention resides in the novel combination and construction of the parts and members illustrated in the accompanying drawings, described in the following specifications and particularly pointed out in the appended claims.

Referring to the drawings:

Figures 1 and 2, illustrate respectively side elevation and plan view of a preferred embodiment of my invention as applied to the automobile.

Figures 3 and 4, show respectively side elevation and plan view of a modified form of control.

Figure 8:
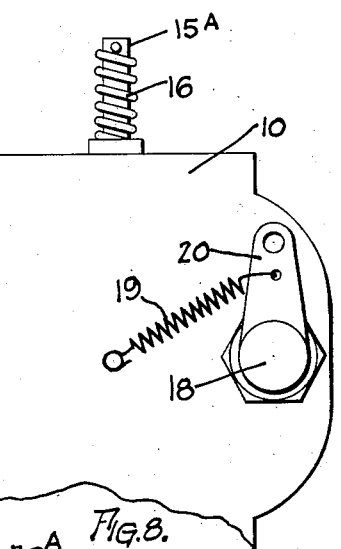

Figure 8, a fragmentary view looking at the end of the cylinder casing showing the coil spring which normally maintains the rotary valve in open position.

Referring to the drawings and particularly to Figs. 5 to 8 inclusive, 10 indicates a casing arranged with a pair of cylinders 11 within which I mount the reciprocating pistons 12 having connecting rods 13 in engagement with the crank shaft 14. The cylinders 11 are spaced within the casing 10 to provide cooling chambers 10$^A$ which can be filled with oil or water for purposes of cylinder cooling. The upper ends of the cylinders 11 are provided with openings 11$^A$ having valves 15 the stems 15$^A$ of which extend through the top of the casing and carry coil springs 16 which normally retain the valves in closed position.

Figure 6:
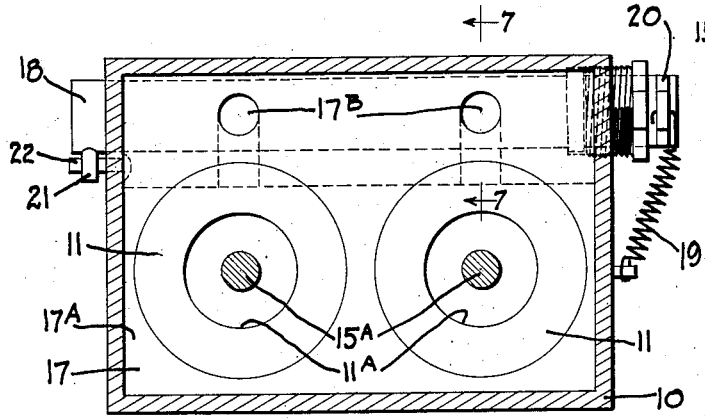
Figure 6, is a cross section taken on line 6—6 of Fig. 5, showing the oil chamber about the oil cylinders and the rotary valve for controlling and regulating the flow of the oil from the oil cylinders back in the oil chamber.
Figure 7:
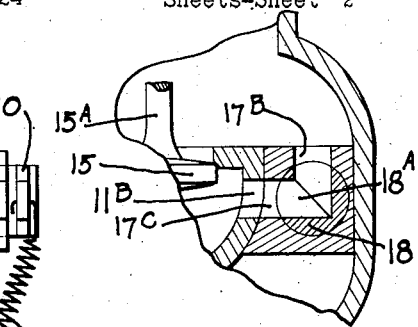
Figure 7 is a cross section on line 7—7 of Fig. 6, showing a detail of the rotary valve when in full open position to permit the free flow of oil from the piston cylinders into the overhead oil chamber.
Figure 5:
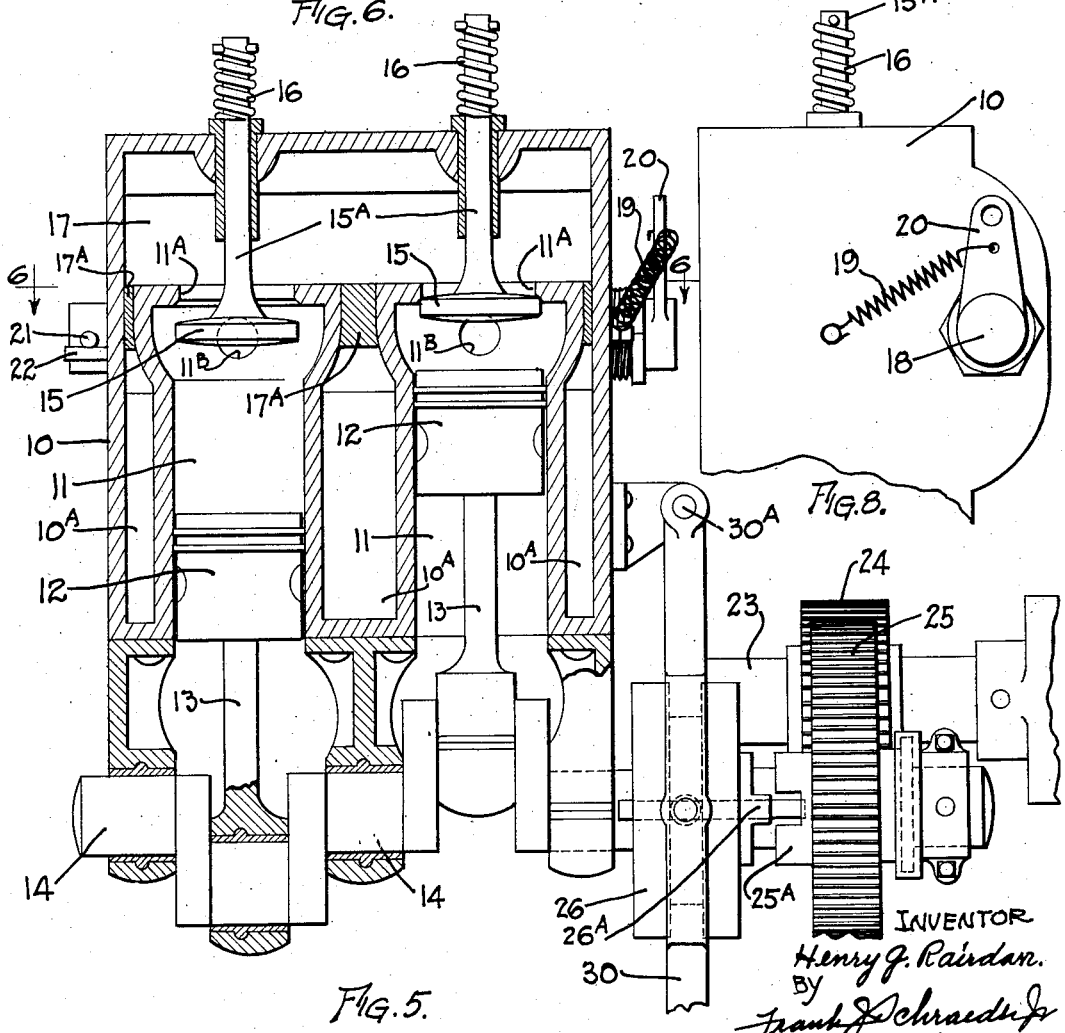
Figure 5, is a sectional elevation of the oil cylinders with a pair of reciprocating pistons and mechanism connecting them operatively to the drive shaft of the automobile.

A suitable chamber 17 is formed above the piston cylinders the greater part of which is filled with oil. The cooling chambers 10$^A$ are completely separated from the overhead oil chamber 17 by a lateral floor or partition 17$^A$. The rear end of the partition 17$^A$ is enlarged to provide a longitudinal passage for the rotary valve 18 which is provided with a pair of spaced right-angular passages 18$^A$ adapted to register the vertical openings 17$^B$ and the lateral openings 17$^C$ of the partition 17. The lateral openings or passages 17$^C$ being in alignment with the open passages 11$^B$ within the upper portions of the cylinders. As shown in Figures 5, 6 and 7, the rotary valve 18 is in full open position and is maintained so by the coil spring 19 which exerts a pressure on the operating arm 20. The full open position of the rotary valve is further maintained by the stop pin 21 having an engagement with the pin 22.

The crank shaft 14 is operatively connected to the automobile main drive shaft 23 by means of the pinion 24 which is keyed on the shaft 23 and which is in mesh with gear 25 loosely mounted on the end of the crank shaft 14. A clutch collar 26 having an integral jaw clutch 26A is slidably keyed to the shaft 14 and is arranged for sliding movement to operatively engage the clutch 26A with the integral jaw clutch 25A of the gear 25 whereby the operation of the pistons 12 is effected. It is readily apparent that any other type of clutch may be utilized instead of the jaw clutch.

Referring now to Figures 1 and 2, the oil brake casing 10 is mounted by means of suitable brackets 27 to the transmission or motor clutch casing 28 of the automobile engine 29. The clutch operating lever 30 is pivotally suspended from the bracket 30A located on the side of the casing 10, and engages the collar 26 whereby the oil pistons are directly connected to the drive with 23. A spring 31 normally retains the clutch 26A out of operation. The lever 30 is further connected at its lower end with the arm 32 through a second stronger spring 33 and the arm 32 is connected by means of the pin 34 with the downwardly extending lever 35 of the foot brake lever 36. In the construction shown in Figures 1 and 2, the end of the rotary valve 18 is provided with a pair of bevel gears 37 and 38, the shaft of gear 38 having an arm 39 fixed thereto which is connected by the link 40 to a slotted member 41, having a slot 41A through which the pin 34 extends. The slotted member 41 is resiliently held by a spring 42 to the frame of the automobile.

It is now readily apparent by reference to Figures 1 and 2, that in the braking action of the foot lever 36, the lever 30 will be first operated to bring the clutch jaws 25A and 26A into engagement for propelling of the oil pistons. However, no braking effect will be accomplished as the rotary valve 18 is normally in open position which permits the oil to pass from above the pistons through passages 11B back into the overhead oil chamber 17. But if the foot brake lever 36 is further depressed the pin 34 will eventually reach the end of the slot 41A and by its engagement of the member 41 will exert a pull on the link 40 and arm 39 to gradually move the rotary valve to closed position thus gradually checking the return flow of the oil into the oil chamber 17. It is obvious that as the passages between the oil chamber 17 and piston cylinders 11 are gradually closed that a braking action will be gradually transmitted to the drive shaft 23, and that when the rotary valve is completely closed, reciprocation of the pistons 12 will be transmitted to the shaft 23.

Referring now to the modification shown in Figures 3 and 4, the arrangement here shown is similar except that the operating mechanism is arranged differently. In this case only the clutch lever 30 is operable by the foot brake 36 which is directly connected to the lever 30 by the link 44. The normal disconnected position of the clutch being retained by the spring 31. The rotary valve 18 being operable by a hand lever 45 located on the side of the steering post and having an extension 45A which is connected by means of a link 46 to the arm 20 which is fixed to the end of the rotary valve.

It is believed that the above description and drawings clearly set forth the invention hence a more extended description is omitted.

I claim:—

1. The combination with a motor drive shaft, of a brake mechanism comprising a fluid braking device having a valve for controlling the braking power thereof and including a crank shaft, and control means adapted for movement by the operator of the motor for operatively connecting said crank shaft with said drive shaft and means for controlling said valve also operable by said control means.

2. The combination with a motor drive shaft, of a brake mechanism comprising a fluid braking device having a valve for controlling the braking power thereof and including a crank shaft, and control means adapted for movement by the operator of the motor for operatively connecting said crank shaft with said drive shaft and said control means arranged by further movement thereof to control the operation of said valve.

3. The combination with a motor drive shaft, of a brake mechanism comprising a fluid braking device having a cylinder, a piston in said cylinder, a fluid chamber adjacent said cylinder, said fluid chamber being in communication only with the interior portion of said cylinder above said piston, a valve for controlling the flow of the liquid from the interior portion of said chamber above said piston into said fluid chamber, a second valve for admitting the return flow of the liquid from said fluid chamber into the upper interior portion of said cylinder above said piston, a crank shaft operatively connected with said piston, means for operatively connecting said crank shaft with the motor drive shaft, and independently operable means for controlling the operation of said first named valve.

4. The combination with a motor drive shaft, of a brake mechanism comprising a fluid braking device having a cylinder, a piston in said cylinder, a fluid chamber adjacent said cylinder, said fluid chamber being in communication only with the interior portion of said cylinder above said piston, a valve for controlling the flow of the liquid from the interior portion of said chamber above said piston into said fluid chamber, a second valve for admitting the return flow of the liquid from said fluid chamber into the upper interior portion of said cylinder above said piston, a crank shaft operatively connected with said piston, means including a foot operable lever for operatively connecting said crank shaft with the motor drive shaft, and independently operable manual means for controlling the operation of said first named valve.

5. The combination with a motor drive shaft, of a brake mechanism comprising a fluid braking device having a valve for controlling the braking power thereof and including a crank shaft, means for operatively connecting said crank shaft and said drive shaft, a link having a slotted opening therein, a connection from said link to said valve, and a projection on said means extending into the slotted opening arranged to transmit motion to said link and valve after the operative engagement of said crank shaft with said drive shaft.

6. In combination with a motor drive shaft, a fluid brake comprising a body having a fluid compartment and a cylinder with a reciprocating piston therein, a crank shaft operatively connected to said piston, a valve adapted to admit the fluid from said compartment into said cylinder, a second valve adapted to close a passage from said cylinder into said compartment to thereby compress the fluid in said cylinder and to arrest the movement of said piston, means for operatively engaging said crank shaft with said drive shaft said means also adapted upon continued movement thereof to control the movement of said second valve.

In witness whereof I affix my signature.

HENRY G. RAIRDAN.